(12) United States Patent
Fourie et al.

(10) Patent No.: US 9,963,216 B1
(45) Date of Patent: May 8, 2018

(54) FILLING APPARATUS FOR HIGH-ALTITUDE BALLOONS

(71) Applicant: X Development LLC, Mountain View, CA (US)

(72) Inventors: Daniel Henry Fourie, Sunnyvale, CA (US); Kyle Brookes, Redwood City, CA (US)

(73) Assignee: X Development LLC, Mountain View, CA (US)

( * ) Notice: Subject to any disclaimer, the term of this patent is extended or adjusted under 35 U.S.C. 154(b) by 156 days.

(21) Appl. No.: 15/054,598

(22) Filed: Feb. 26, 2016

(51) Int. Cl.
| | | |
|---|---|---|
| *B64B 1/58* | (2006.01) | |
| *B64B 1/40* | (2006.01) | |
| *B29C 65/08* | (2006.01) | |
| *B29K 67/00* | (2006.01) | |
| *B29L 31/30* | (2006.01) | |

(52) U.S. Cl.
CPC ............... *B64B 1/58* (2013.01); *B29C 65/08* (2013.01); *B64B 1/40* (2013.01); *B29K 2023/06* (2013.01); *B29K 2067/003* (2013.01); *B29L 2031/3076* (2013.01)

(58) Field of Classification Search
CPC .............. B64B 1/62; B64B 1/58; B29C 65/08
See application file for complete search history.

(56) References Cited

U.S. PATENT DOCUMENTS

| | | | |
|---|---|---|---|
| 2,207,212 A | 7/1940 | Arey | |
| 2,392,199 A | 1/1946 | Steiger | |
| 2,666,601 A | 1/1954 | Huch | |
| 2,779,554 A | 1/1957 | Kizzek | |
| 2,919,082 A | 12/1959 | Winzen et al. | |
| 2,954,187 A | 9/1960 | Winzen | |
| 3,002,490 A | 10/1961 | Murray | |
| 3,289,026 A | 11/1966 | Elton | |
| 3,332,390 A | 7/1967 | Ashline | |
| 3,856,186 A | 12/1974 | Hay | |

(Continued)

FOREIGN PATENT DOCUMENTS

WO          8805328 A1      7/1988

OTHER PUBLICATIONS

"Using the Pinch-Off Tool", 2009.
"Copper Pinch-Off Tubes", Huntington Mechanical Laboratories, Inc., Downloaded on Apr. 10, 2014.

*Primary Examiner* — Justin M Benedik
(74) *Attorney, Agent, or Firm* — Lerner, David, Littenberg, Krumholz & Mentlik, LLP (57) ABSTRACT

Aspects of the disclosure provide a fill port apparatus for filling high altitude balloons, such as those used in communications networks, with lighter than air lift gasses. For instance, the fill port apparatus includes a tubular body portion having a passageway extending between a first end and a second end of the tubular body portion. The fill port apparatus also includes an attachment structure arranged at the first end of the tubular body portion. This structure is configured to attach to a top plate of a balloon envelope. The fill port apparatus also includes a plurality of energy directing structures arranged on an interior surface of the tubular body portion. These energy directing structures extend into the passageway from the interior surface and are each configured to contact at least one other of the plurality of energy directing structures when the tubular body portion is welded to itself.

10 Claims, 11 Drawing Sheets

(56) References Cited

U.S. PATENT DOCUMENTS

| | | | |
|---|---|---|---|
| 3,929,091 A | 12/1975 | Holder et al. | |
| 4,238,095 A | 12/1980 | Slater | |
| 4,434,958 A | 3/1984 | Rougeron et al. | |
| 4,836,128 A | 6/1989 | Walker | |
| 5,104,059 A | 4/1992 | Rand et al. | |
| 5,301,631 A | 4/1994 | Vining | |
| 5,776,291 A | 7/1998 | Lang | |
| 5,873,764 A | 2/1999 | Scherr | |
| 6,892,772 B1 | 5/2005 | Wang et al. | |
| 7,147,536 B1 | 12/2006 | Hartelius | |
| 7,344,267 B2 | 3/2008 | Carito | |
| 7,356,390 B2 * | 4/2008 | Knoblach | B64B 1/40 244/31 |
| 7,380,575 B2 | 6/2008 | Stricklin | |
| 7,686,668 B1 | 3/2010 | Butler | |
| 7,708,222 B2 | 5/2010 | Lee | |
| 7,934,522 B2 | 5/2011 | Liao et al. | |
| 8,167,859 B2 * | 5/2012 | Shah | A61F 5/445 604/103.03 |
| 8,186,392 B2 | 5/2012 | Gustafsson | |
| 8,196,620 B2 | 6/2012 | Fransen | |
| 8,707,661 B2 * | 4/2014 | Kinoshita | B29C 65/02 53/451 |
| 8,814,084 B2 * | 8/2014 | Shenhar | A63H 27/10 244/128 |
| 8,936,568 B2 | 1/2015 | Webler et al. | |
| 8,950,107 B1 | 2/2015 | Rosenbloom et al. | |
| 9,027,877 B1 * | 5/2015 | Brookes | B64B 1/58 137/223 |
| 9,067,666 B1 | 6/2015 | Roach et al. | |
| 9,266,599 B1 * | 2/2016 | Ratner | B64B 1/62 |
| 9,346,532 B1 * | 5/2016 | Ratner | B64B 1/62 |
| 9,643,707 B1 * | 5/2017 | Ratner | B64B 1/58 |
| 9,643,708 B2 * | 5/2017 | Ratner | B64B 1/62 |
| 2004/0045651 A1 | 3/2004 | Haunhorst et al. | |
| 2004/0126279 A1 | 7/2004 | Renzi et al. | |
| 2005/0014134 A1 | 1/2005 | West et al. | |
| 2005/0098227 A1 | 5/2005 | Stanley | |
| 2007/0095424 A1 | 5/2007 | Powell et al. | |
| 2007/0297174 A1 | 12/2007 | Girolami | |
| 2008/0262450 A1 * | 10/2008 | Shah | A61F 5/445 604/339 |
| 2009/0014644 A1 | 1/2009 | Yang et al. | |
| 2009/0047864 A1 | 2/2009 | Burchett et al. | |
| 2009/0303704 A1 | 12/2009 | Schrimmer | |
| 2011/0303705 A1 | 12/2011 | Coroneos | |
| 2012/0053612 A1 * | 3/2012 | Birk | A61F 5/003 606/192 |
| 2012/0097293 A1 | 4/2012 | Dancescu et al. | |
| 2012/0191123 A1 | 7/2012 | Brister et al. | |
| 2013/0109539 A1 | 5/2013 | Chen | |
| 2013/0112317 A1 | 5/2013 | Draier | |
| 2013/0119188 A1 | 5/2013 | Ciampa et al. | |
| 2013/0146174 A1 | 6/2013 | Zinn et al. | |
| 2013/0167976 A1 | 7/2013 | Vervoort et al. | |
| 2014/0158823 A1 | 6/2014 | Smith et al. | |
| 2014/0367511 A1 | 12/2014 | Knoblach et al. | |
| 2015/0283473 A1 | 10/2015 | Frazier et al. | |
| 2016/0018375 A1 | 1/2016 | Fahrni et al. | |
| 2016/0166968 A1 | 6/2016 | Lee | |

\* cited by examiner

FILLING APPARATUS FOR HIGH-ALTITUDE BALLOONS

BACKGROUND

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. Because of the various forces experienced by these balloons during deployment and operation, there is a balancing of needs between flexibility and stability of materials. The balloons may be made of an envelope material configured in sections or lobes to create a "pumpkin" or lobed balloon. The lobes are supported by a plurality of tendons.

Before a balloon can be deployed, its envelope must be inflated with lighter than air lift gas. Helium and hydrogen gases are two alternatives for lighter and air lift gases. Helium is an inert gas and thus considered generally safe. With helium, filling features can be sealed with O-rings, check vales, or caps in a manual setting. As an example, a person may remove a cap from a filling port, insert a filling hose, pull out the filing hose, and cap the filling port. When the filling hose is removed, gas can escape from the balloon. Even traditional one-way valves may allow a small amount of gas to leak. Purging after closing the valve, but prior to disconnecting the fill line can prevent leaks, but adds additional complexity to the design. However, with helium prices on the rise and reduced availability, hydrogen is becoming a more economical option. However, as hydrogen is highly explosive when combined with air, its use can present safety issues, especially during inflation.

BRIEF SUMMARY

Aspects of the present disclosure are advantageous for providing a leak free fill port that is also simple, robust and economical. In one example, a fill port apparatus includes a tubular body portion having a passageway extending between a first end of the tubular body portion and a second end of the tubular body portion. The fill port apparatus also includes an attachment structure arranged at the first end of the tubular body portion. The attachment structure being configured to attach to a top plate of a balloon envelope. The fill port apparatus also includes a plurality of energy directing structures arranged on an interior surface of the tubular body portion and extending into the passageway from the interior surface. Each of the plurality of energy directing structures being configured to contact at least one other of the plurality of energy directing structures when the tubular body portion is welded to itself.

In one example, the apparatus consists of a plastic. In another example, the plurality of energy directing structures is arranged in a helical configuration. In another example, the plurality of energy directing structures includes a first energy directing structure arranged to extend around an entire circumference of the interior surface of the tubular body portion. In this example, a portion of the plurality of energy directing structures are arranged to extend away from the first energy directing structure. In another example, a width dimension of each of the plurality of energy directing structures is less than 1 millimeter. In another example, each of the plurality of energy directing structures extends no more than 1 millimeter outward from the interior surface into the passageway. In another example the apparatus also includes a pair of welding guides arranged on an exterior surface of the tubular body portion, wherein the welding guides indicate an area on exterior surface that corresponds to locations of the plurality of energy directing structures on the interior surface. In another example, the fill port apparatus includes a radial projection configured for attachment with a filling device for filling a balloon envelope of the balloon with lift gas via the passageway.

Another aspect of the disclosure provides a system including a balloon having a balloon envelope and a top plate arranged at an apex of the balloon envelope as well as a fill port apparatus attached to the top plate. The fill port apparatus includes a tubular body portion having a passageway extending between a first end of the tubular body portion and a second end of the tubular body portion. The first end is attached to the top plate. The fill port apparatus also includes a plurality of energy directing structures arranged on an interior surface of the tubular body portion and extending into the passageway from the interior surface. Each of the plurality of energy directing structures being configured to contact at least one other of the plurality of energy directing structures when the tubular body portion is welded to itself.

In one example, the second end is configured to attachment with a filling device for filling the balloon envelope with lift gas via the passageway. In another example, the apparatus consists of a plastic. In another example, the plurality of energy directing structures is arranged in a helical configuration. In another example, the energy directing structures include a first energy directing structure arranged to extend around an entire circumference of the interior surface of the tubular body portion. In this example, a portion of the plurality of energy directing structures are arranged to extend away from the first energy directing structure. In another example, the fill port apparatus further includes a pair of welding guides arranged on an exterior surface of the tubular body portion. The welding guides indicate an area on exterior surface that corresponds to locations of the plurality of energy directing structures on the interior surface.

A further aspect of the disclosure provides a method of filling a balloon envelope of a balloon with lift gas. The balloon includes a top plate arranged at an apex of the balloon and a fill port apparatus attached to the top plate. The method includes attaching a filling device to a first end of a tubular body portion of the fill port apparatus. The tubular body portion includes a passageway extending between the first end of the tubular body portion and a second end of the tubular body portion. The tubular body portion also includes a plurality of energy directing structures arranged on an interior surface of the tubular body portion and extending into the passageway from the interior surface. The method also includes filling the balloon envelope with lift gas by providing lift gas at the first end via the filling device such that the lift gas passes through the passageway and enters the balloon envelope through the second end of the tubular body portion. The method also includes creating a weld by vibrating the plurality of energy directing structures. The weld forms a seal across the tubular body portion and preventing lift gas from escaping from the balloon envelope via the passageway.

In one example, the method also includes cutting the tubular body portion in order to remove a portion of the tubular body portion. In another example, the plurality of energy directing structures are arranged in a helical configuration such that the weld includes at least two of the plurality of energy directing structures crossing one another. In another example, creating the weld include using an ultrasonic welding machine, melting the plurality of energy directing structures, and cooling the plurality of energy directing structures.

DETAILED DESCRIPTION

The technology relates generally to features for filling high altitude balloons with gas. For example, such balloons may need to be filled with lighter than air lift gasses such as helium or hydrogen. Helium is typically preferred in such applications as it is inert and generally safer to work with than hydrogen. With helium, filling features can be sealed with O-rings, check vales, or caps in a manual setting. As an example, a person may remove a cap from a filling port, insert a filling hose, pull out the filing hose, and cap the filling port. When the filling hose is removed, gas can escape from the balloon. Even traditional one-way valves may allow a small amount of gas to leak. Purging after closing the valve, but prior to disconnecting the fill line can prevent leaks, but adds additional complexity to the design. As helium becomes more expensive with lesser availability, hydrogen becomes a more attractive option. However, because hydrogen is flammable, it is important to have filling features which reduce the likelihood of gas escaping, which could cause serious damage or injury to persons.

In order to provide, reliable, economical, and safe filling of high altitude balloons when using non-flammable or flammable filler gasses, such as hydrogen, a fill port apparatus may be used. The fill port apparatus may include a tubular body portion having an internal passageway. The passageway extends between ends of the tubular body portion. A first end of the tubular body portion may be configured for attachment to a filling device for filing a balloon for lift gas. For instance, the fill port includes a radial projection that allows for a filling device to form a seal with the fill port apparatus.

A second end of the tubular body portion includes a flange having a surface configured to be heat sealed to a top plate of a balloon. In this regard, the flange, as well as the rest of the fill port may be made of various plastics which can be melted in order to form a seal between the flange and a top plate of plastic. Because the entire structure of the fill port is made of plastic, the fill port apparatus can be manufactured relatively inexpensively using plastic injection molding or similar processes. In some instances, proximate to this flange may be a port through the tubular body portion which allows for a pressure barb to sense the pressure within the tube.

Within the passageway is a formation of energy directing structures. These energy directing structures may be arranged in any number of different configurations. For instance, one configuration may resemble diagonal lines which extend into the passageway from an interior surface of the tubular body portion. Because of the curved shape of the interior surface of the tubular body portion, the energy structures may actually be arranged in a helical shape. In another example, the configuration may resemble a horizontal line with a plurality of vertical lines again which extend into the passageway from an interior surface of the tubular body portion.

As with the fill port apparatus, the energy directing structures may also be formed of plastic. In this regard, the energy directing structures may be formed using plastic injection molding where the energy directing structures are formed by inverted corresponding configurations within the mold. Again, this allows for an inexpensive way to mass produce the fill port apparatus. Alternatively, the energy directing structures may be formed separately and attached using welding or heat sealing techniques.

The fill port apparatus may also include welding guides on an external surface of the tubular body portion. The welding guides may be a pair of raised edges, grooves, or lines that mark area of the interior surface at which the energy directing structures are arranged. In this regard, the welding guides may provide a person or machine with an indication of where the energy directing structures are located, even where these structures are not directly visible.

To fill a balloon envelope of a balloon, the second end is connected to the top plate of the balloon as discussed above and the first end is connected to a filling device. The filling device may then provide lift gas such as hydrogen or helium. The lift gas passes through the passageway and enters into the balloon envelope through a corresponding opening in the top plate. Once the filling is completed, the tubing may be welded shut using an ultrasonic welding machine. By doing so, there is no chance for hydrogen gas to escape. In addition, the welding does not need to be performed manually by a person, but may be done automatically by another apparatus.

The ultrasonic welding machine may include an anvil and a horn which are arranged at opposing sides of the external surface of the tubular body between the welding guides. In other words, the anvil and horn may be arranged to press against the external surface of the tubular body at locations corresponding to where the energy directing structures are located on the internal surface.

In order to weld the fill port shut, the horn is vibrated so that it moves, for example, a few hundred microns back and forth against the external surface of the tubular body portion. At the same time, the horn and anvil are moved towards one another, crushing opposing sides of the tubular body portion towards one another. This causes energy directing structures from opposite sides of the internal surface to contact and rub against one another. This contact and rubbing (from the vibrations of the horn), in turn, causes the energy directing structures to heat up and melt which also heats up and softens the interior surface proximate to the energy directing structures. Again, the small dimensions of the energy directing structures allows them to heat up (and cool down) quickly. Once the opposing interior surface and are completely pressed together, the vibrations are stopped, and melted energy directing structures and interior surface are quickly cooled. This cooling re-hardens the plastic of the interior surface and the energy directing structures forming a welded seal between the edges of the welding guide.

While various configurations of the energy directing structures may be used, some configurations may require greater care during the welding process. For instance, the horizontal and vertical line configuration may provide a more structurally sound seal when the vertical lines are offset from one another, but the horizontal line is welded to itself. With the helical configuration of energy directing structures, however, such precision is not required because welding at different positions and angles within the welding guides would still result in a similar welded seal arrangement.

Once the welding is complete, the first end of the tubular body portion may then be cut away from the balloon using a knife, scissors or other cutting device at a point between the area of the welded seal and the first end. In this regard, the welding guides may again be used to determine where the tubular body portion should be cut. The result is a filled balloon envelope with a very robust leak-free seal at the area of the welded seal.

Figure 1:
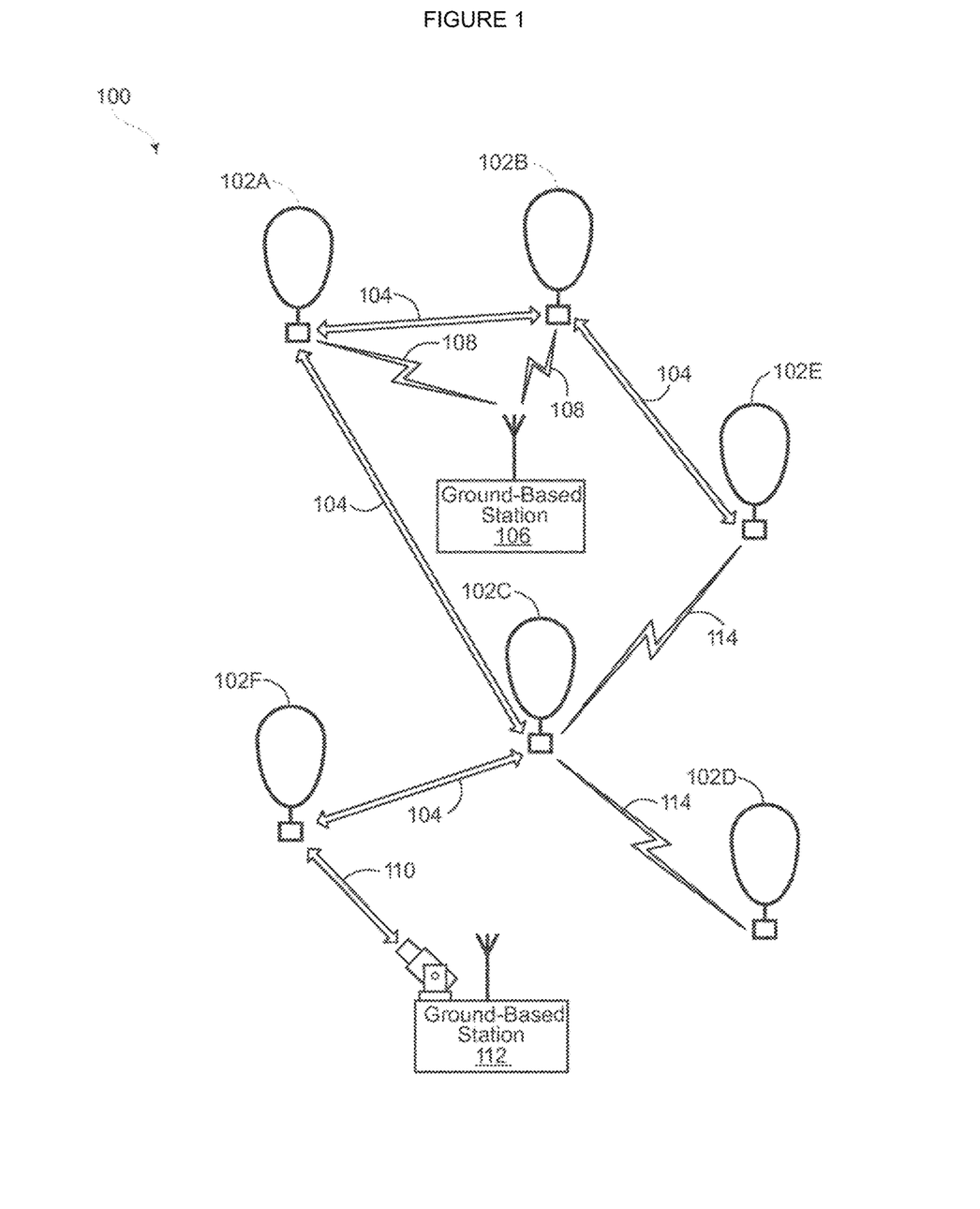
FIG. 1 is a functional diagram of a system in accordance with aspects of the disclosure.

As noted above, the fill port provides a single use, simple, and nonmoving part that is reliable, lightweight, economical, and safe when using flammable filler gasses such as hydrogen. The width of the passageway allows for a fairly high flow rate of lift gas, decreasing fill time for the balloon envelope. The ultrasonic welding involves much lower temperatures than heat sealing or other types of welding reducing the risk of igniting the lift gas. In addition, during the welding, the heat is focused on the inside surface of the tubular body portion which actually further decreases the risk of energy (or heat) being transmitted to and igniting the lift gases. Similarly, because the heat moves from the inside of the tubular body portion outwards, there is much less risk of heat going all the way through the tubular body portion FIG. 1 depicts an example system 100 in which a high altitude balloons as described above may be used. This example should not be considered as limiting the scope of the disclosure or usefulness of the features described herein. System 100 may be considered a "balloon network." In this example, balloon network 100 includes a plurality of devices, such as of high altitude balloons 102A-F as well as ground base stations 106 and 112. Balloon network 100 may also include a plurality of additional devices, such as various computing devices (not shown) as discussed in more detail below.

As shown, the devices of system 100 are configured to communicate with one another. As an example, the balloons may include free-space optical links 104 and/or radiofrequency (RF) links 114 in order to facilitate intra-balloon communications. In this way, balloons 102A-F may collectively function as a mesh network for packet data communications. Further, at least some of balloons 102A-B may be configured for RF communications with ground-based stations 106 and 112 via respective RF links 108. Some balloons, such as balloon 102F, could be configured to communicate via optical link 110 with ground-based station 112.

As noted above, to transmit data to another balloon, a given balloon 102 may be configured to transmit an optical signal via an optical link 104. In addition, the given balloon 102 may use one or more high-power light-emitting diodes (LEDs) to transmit an optical signal. Alternatively, some or all of the balloons may include laser systems for free-space optical communications over the optical links 104. Other types of free-space optical communication are possible. Further, in order to receive an optical signal from another balloon via an optical link 104, a given balloon may include one or more optical receivers.

The balloons 102A-F may collectively function as a mesh network. More specifically, since balloons 102A-F may communicate with one another using free-space optical links, the balloons may collectively function as a free-space optical mesh network where each balloon may function as a node of the mesh network. As noted above, the balloons of balloon network 100 may be high-altitude balloons, which are deployed in the stratosphere. As an example, the balloons may generally be configured to operate at altitudes between 18 km and 25 km above the Earth's surface in order to limit the balloon's exposure to high winds and interference with commercial airline flights. Additional aspects of the balloons are discussed in greater detail below, with reference to FIG. 2.

Figure 2:
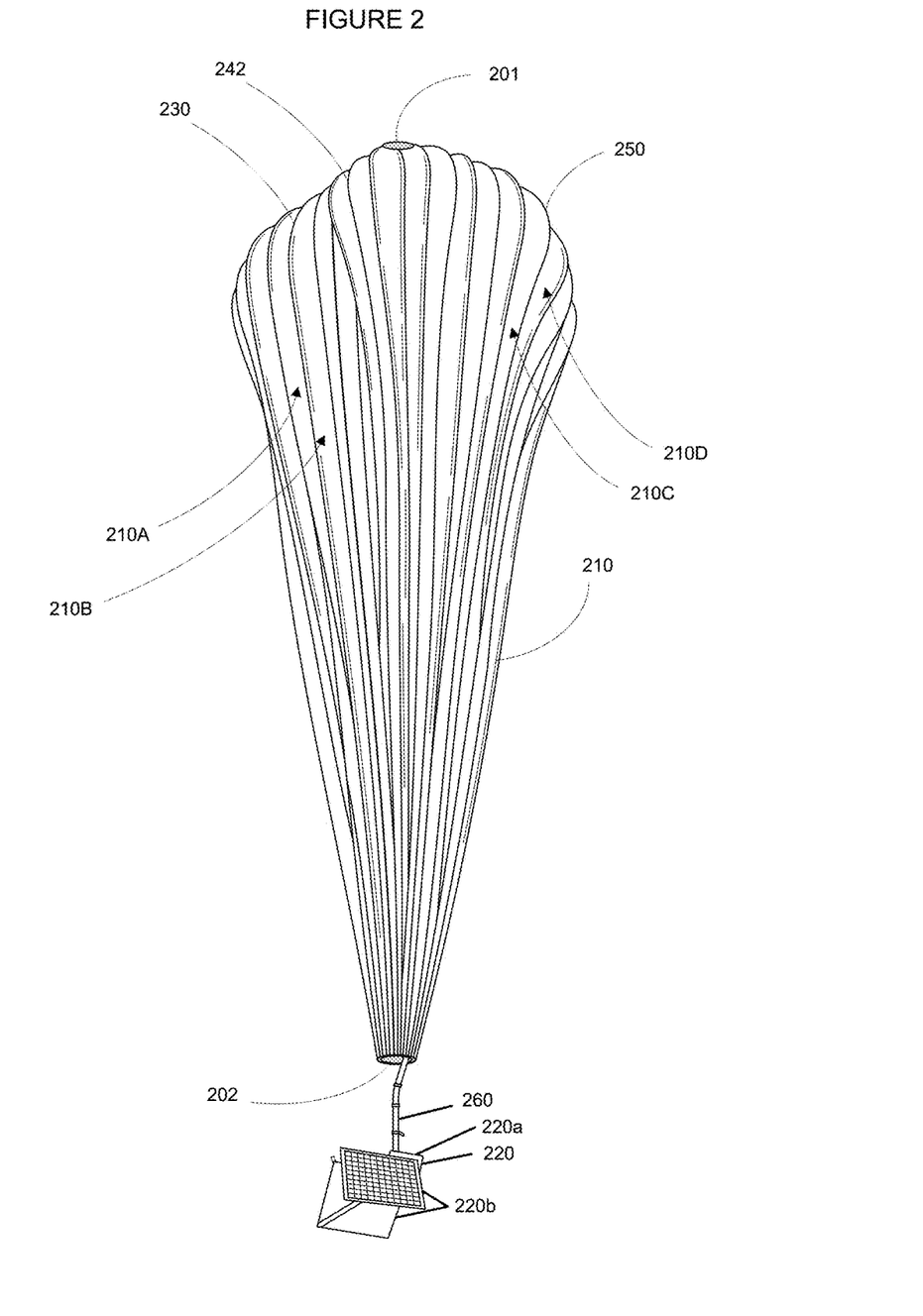
FIG. 2 is an example of a balloon in accordance with aspects of the disclosure.

FIG. 2 is an example balloon 200, which may represent any of the balloons of balloon network 100. As shown, the balloon 200 includes an envelope 210, a payload assembly 220, including a payload 220a and solar panels 220b, and a plurality of tendons 230, 240 and 250 attached to the envelope 210.

The balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of balloon 200 may be affixed to the envelope by a rigid connection 260. The payload 220 may include a computer system (not shown), having one or more processors and on-board data storage. The payload 220 may also include various other types of equipment and systems (not shown) to provide a number of different functions. For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope. In this example, balloon envelope 210 is comprised of envelope gores 210A-210D.

Pressurized lift gas within the balloon envelope 210 may cause a force or load to be applied to the balloon 200. In that regard, the tendons 230-250 provide strength to the balloon 200 to carry the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using an apparatus, such as top cap 201 positioned at the apex of balloon envelope 210. Bottom ends of the tendons 230, 240 and 250 may also be connected to one another. For example, a corresponding apparatus, e.g., bottom cap 220, may be disposed at a base or bottom of the balloon envelope 210. The top cap 201 at the apex may be the same size and shape as and bottom cap 220 at the bottom. Both caps include corresponding components for attaching the tendons 230, 240 and 250 to the balloon envelope 210, and may be formed from stainless steel, aluminum, or various plastics.

As noted above, in order to provide, reliable, economical, and safe when using flammable filler gasses such as hydrogen, a fill port apparatus may be used. The fill port apparatus may include a tubular body portion having an internal passageway. The passageway extends between ends of the tubular body portion. In one example, the tubular body portion may be approximately 450 mm, or more or less, in length, while passageway may be approximately 50 mm, or more or less, in width.

Figure 3:
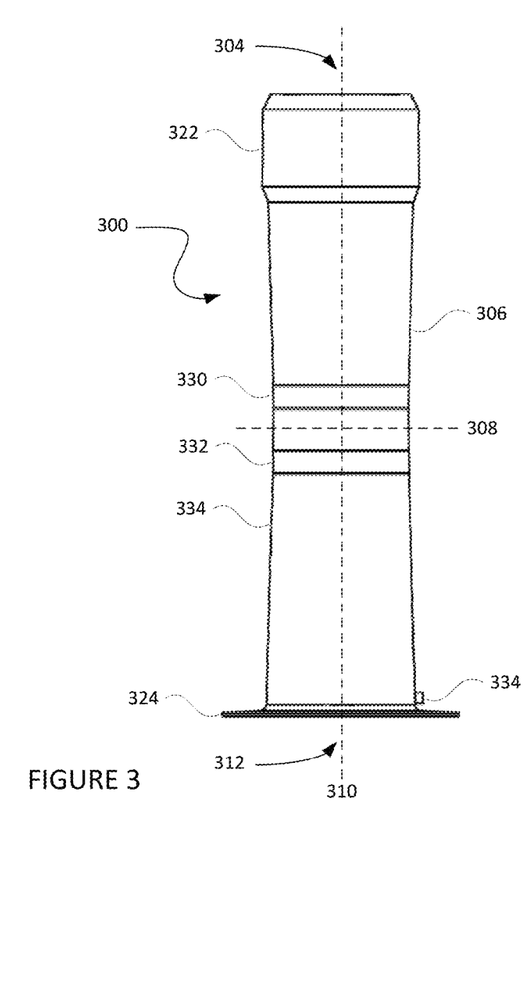
FIGS. 3-7 are example views of a fill port assembly from various perspectives in accordance with aspects of the disclosure.
Figure 4:
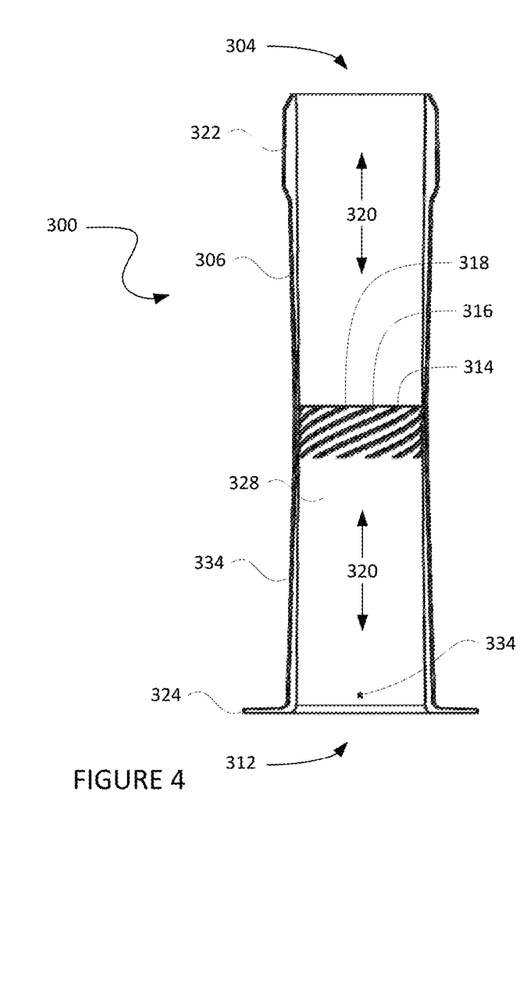
Figure 5:
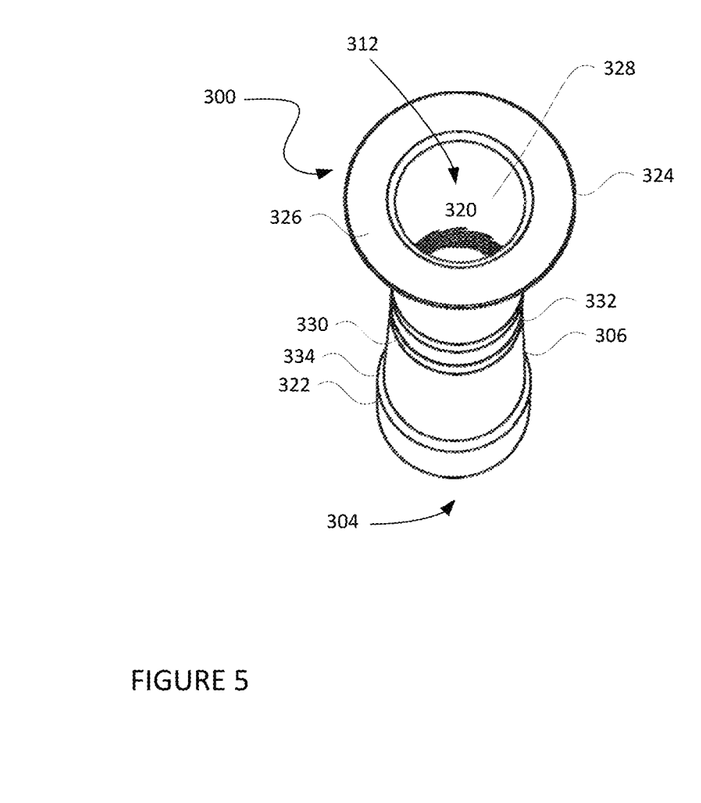
Figure 6:
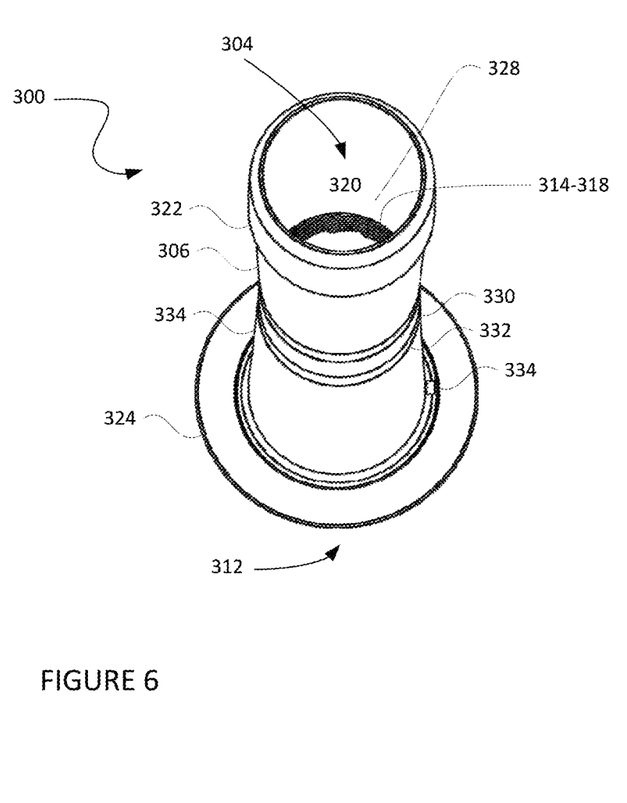
Figure 7:
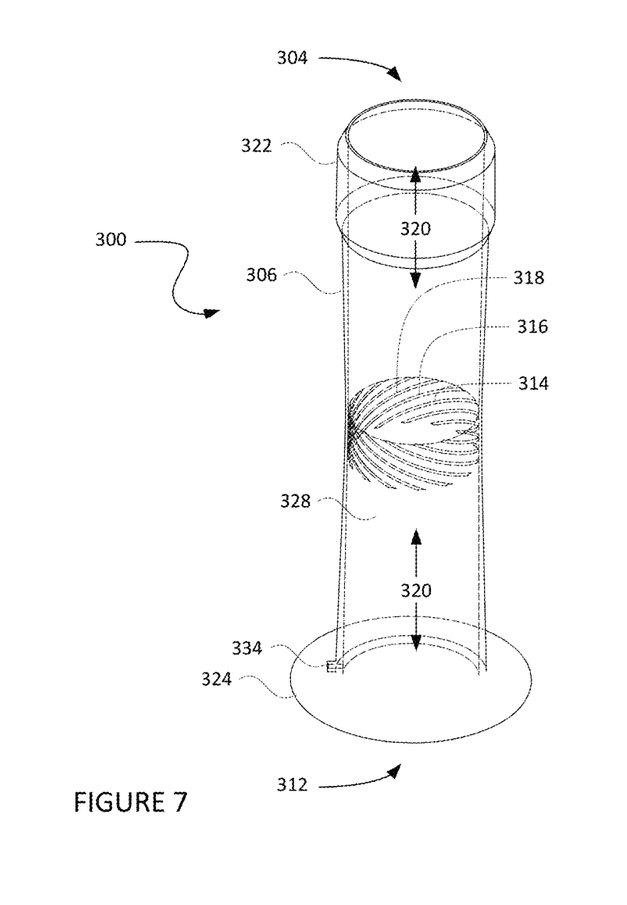

FIGS. 3-7 are example views of a fill port apparatus 300 from various perspectives. For instance, FIG. 3 is an external side view of the fill port apparatus and FIG. 4 is a cross sectional view of the fill port apparatus. FIG. 4 is a cut-away view of fill port apparatus 300 through plane 302 of FIG. 3. FIGS. 5 and 6 are external side views of fill port apparatus 300 shown from different angles from FIG. 3. For instance, in FIG. 5, a first end 304 of a tubular body portion 306 of the fill port apparatus 300 as shown in FIG. 3 is rotated about axis 308 in plane 310 (out of the page) approximately 45 degrees. Similarly, in FIG. 6, a second end 312 of the tubular body portion 306 of the fill port apparatus 300 as shown in FIG. 3 is rotated about axis 308 in plane 310 (into the page) approximately 135 degrees. FIG. 7 is a view of fill port apparatus 300 as shown in FIG. 3 is rotated about axis 308 in plane 310 (out of the page) approximately 15 degrees; however, in this example, tubular body portion 306, shown in dashed line, is shown as transparent in order to depict internal energy directing structures 314-318 with respect to their internal position on the tubular body portion 306.

As noted above, the fill port apparatus 300 includes a tubular body portion 306 having an internal passageway 320. The passageway 320 extends between the ends 304, 312 of the tubular body portion 306. In one example, the tubular body portion may be approximately 450 mm, or more or less, in length, while passageway may be approximately 50 mm, or more or less, in width.

The first end 304 of the tubular body portion 306 may be configured for attachment to a filling device for filing a balloon for lift gas. For instance, the fill port includes a radial projection 322 that allows for a filling device to form a seal with the fill port apparatus 300.

The second end 312 of the tubular body portion 306 includes a flange 324 having a surface 326 (shown in FIG. 4) configured to be heat sealed to a top plate of a balloon, such as top plate 201 (shown in FIG. 2). In this regard, the flange 324, as well as the rest of the fill port may be made of various plastics which can be melted in order to form a seal between the flange and a top plate of plastic. Because the entire structure of the fill port is made of plastic, the fill port apparatus can be manufactured relatively inexpensively using plastic injection molding or similar processes. In some instances, proximate to this flange may be a port 334 through the tubular body portion which allows for a pressure barb to sense the pressure within the tube.

Within the passageway 320 is a formation of energy directing structures 314-318 arranged on internal surface 328 of the tubular body portion 306. These energy directing structures may be arranged in any number of different configurations. For instance, one configuration, depicted in FIGS. 4, 5, 6, and 7 may resemble diagonal lines which extend into the passageway from an interior surface of the tubular body portion. Because of the curved shape of the interior surface of the tubular body portion, the energy structures may actually be arranged in a helical shape as depicted in FIG. 7.

Figure 8:
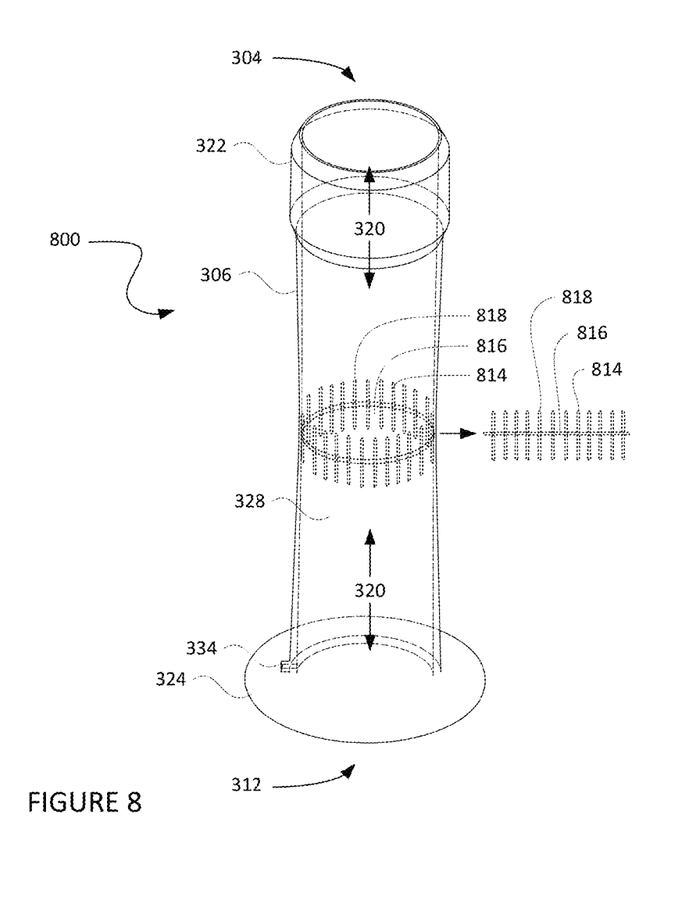
FIG. 8 is an example view of another fill port assembly in accordance with aspects of the disclosure.

In another example, fill port apparatus 800 of FIG. 8 is configured similarly to fill port apparatus 300, having a tubular body portion 306, with first and second ends 304, 312, flange 324, internal and external surfaces 328, 334, and welding guides (not shown). In this example, energy directing structures 814-818 resemble a horizontal line with a plurality of vertical lines again which extend into the passageway from an interior surface of the tubular body portion. In this example, the energy directing structures 814-818 may be arranged on an internal surface of the tubular body portion 306 within the passageway 320. In this regard, the energy directing structures 814-818 may simply replace the energy directing structures 314-318 of FIGS. 4, 5, 6, and 7.

Figure 9:
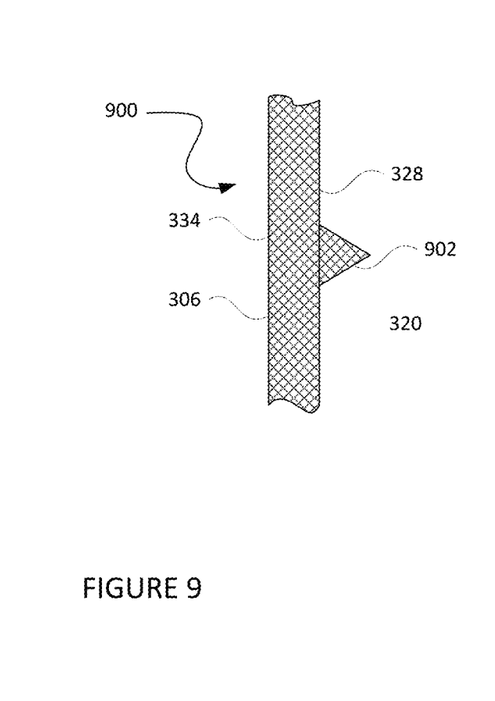
FIG. 9 is an example cross sectional view of an energy directing structure and fill port assembly in accordance with aspects of the disclosure.

FIG. 9 depicts a cross sectional view 900 of an energy directing structure 902 that may correspond to any one of energy directing structures 314-318 or 814-818 on an portion of the internal surface 328 of the tubular body portion 306. In this example, the projections of the energy directing structures may include a triangular or ridge-like shapes that extend less than 1 mm or more or less into the passageway 320 from the interior surface 328 of the tubular body portion 306. The low profile and narrow width of the energy directing structures may allow for easier welding as discussed in further detail below.

As with the fill port apparatuses 300 and 800, the energy directing structures 314-318 or 814-818 may also be formed of plastic. In this regard, the energy directing structures 314-318 or 814-818 may be formed using plastic injection molding where the energy directing structures are formed by inverted corresponding configurations within the mold. Again, this allows for an inexpensive way to mass produce the fill port apparatus. Alternatively, the energy directing structures may be formed separately and attached using welding or heat sealing techniques.

Returning to FIGS. 3 and 4, the fill port apparatus 300 (and 800) may also include welding guides 330, 332 on an external surface 334 of the tubular body portion 306. As can be seen from FIGS. 3 and 4, the welding guides 330, 332 may be a pair of raised edges, grooves, or lines that mark area of the interior surface at which the energy directing structures 314-318 (or 814-818) are arranged. In this regard, the welding guides 330, 332 may provide a person or machine with an indication of where the energy directing structures 314-318 (or 814-818) are located, even where these structures are not directly visible.

Figure 10:
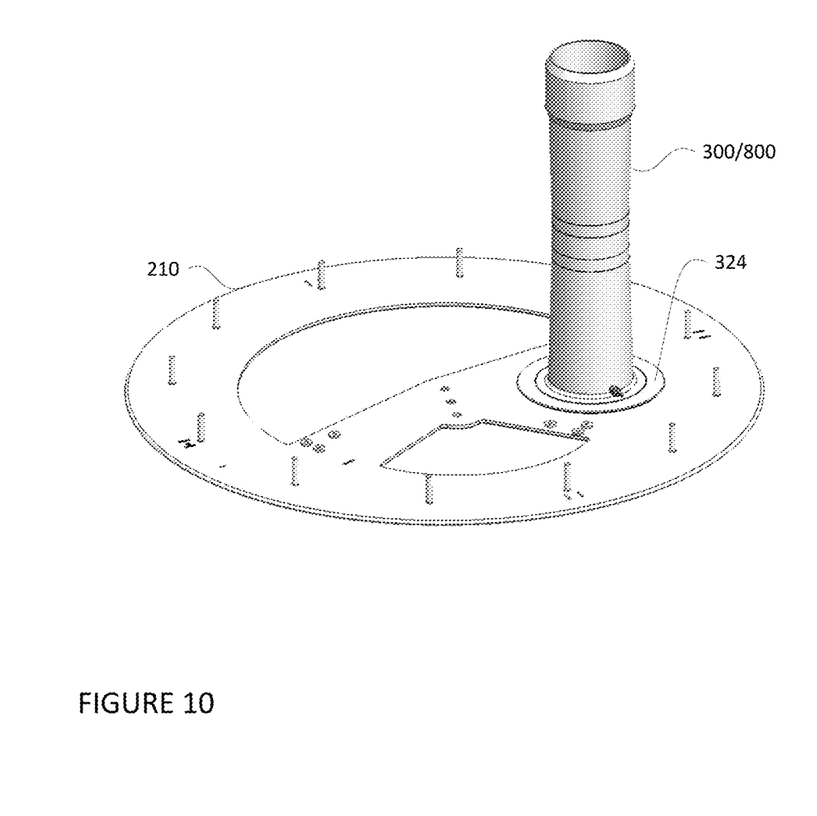
FIG. 10 is an example of a fill port assembly attached to a top plate of a balloon in accordance with aspects of the disclosure.

To fill a balloon envelope 210 of a balloon 200, the second end 312 of the fill port apparatus 300 or 800 is connected to the top plate 201 of the balloon shown in FIG. 10. As noted above, this may be achieved by heat sealing surface 326 of flange 324 to the top plate 201.

Figure 11:
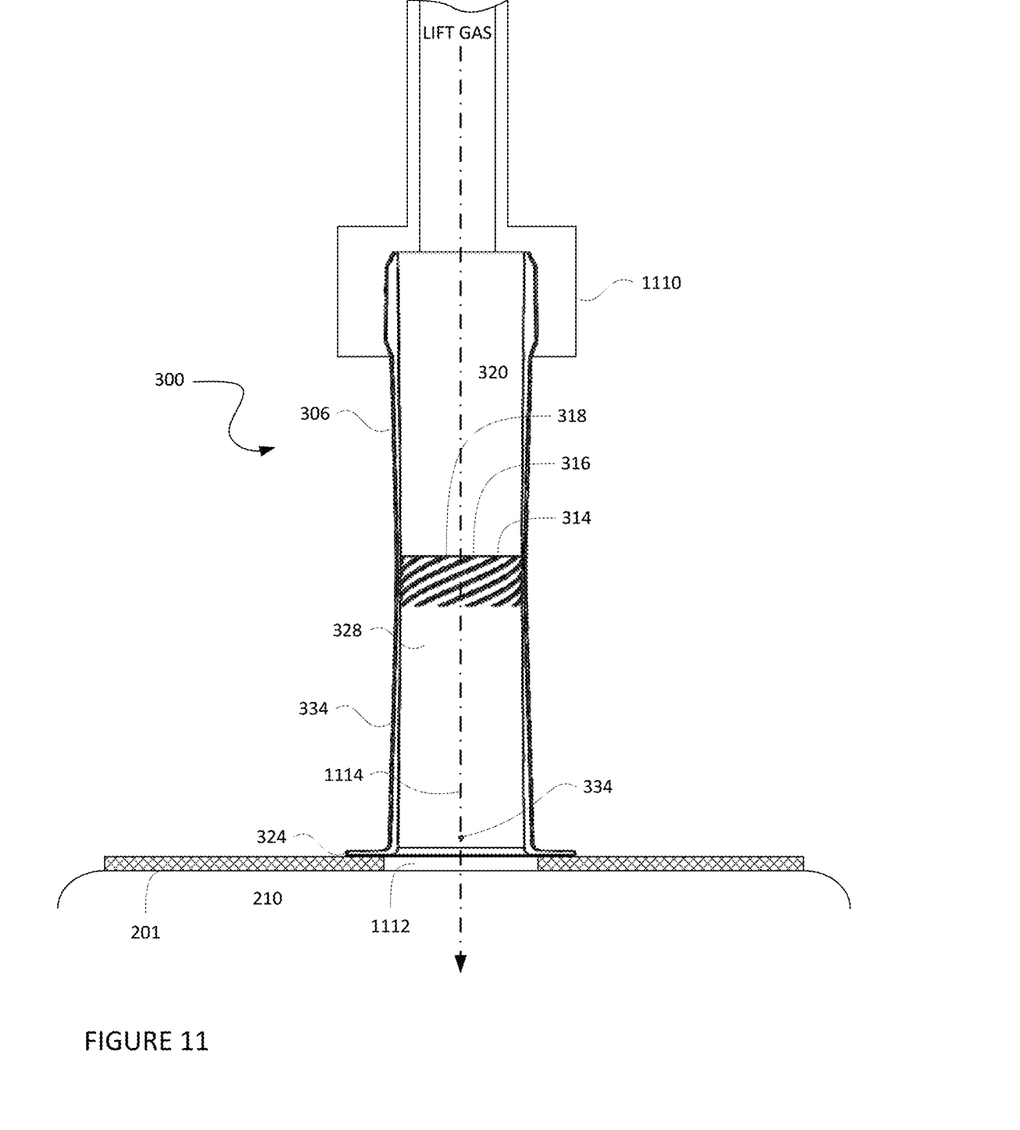
FIG. 11 is an example cross sectional view of a filling device attached to a fill port assembly attached to a top plate of a balloon in accordance with aspects of the disclosure.

As shown in the cross-sectional view of FIG. 11, the first end 304 fill port apparatus 300 (which could be replaced by fill port apparatus 800) is connected to a filling device 1110. The filling device may then provide lift gas such as hydrogen or helium. The lift gas generally follows the path of arrow 1114: passing from the first end 304 through the passageway 320 to the second end 312 and thereafter entering into the balloon envelope 210 through a corresponding opening 1112 in the top plate 201. Once the filling is completed, the fill port apparatus 300 or 800 may be welded shut using an ultrasonic welding machine. By doing so, there is no chance for hydrogen gas to escape. In addition, the welding does not need to be performed manually by a person, but may be done automatically by another apparatus.

Figure 12:
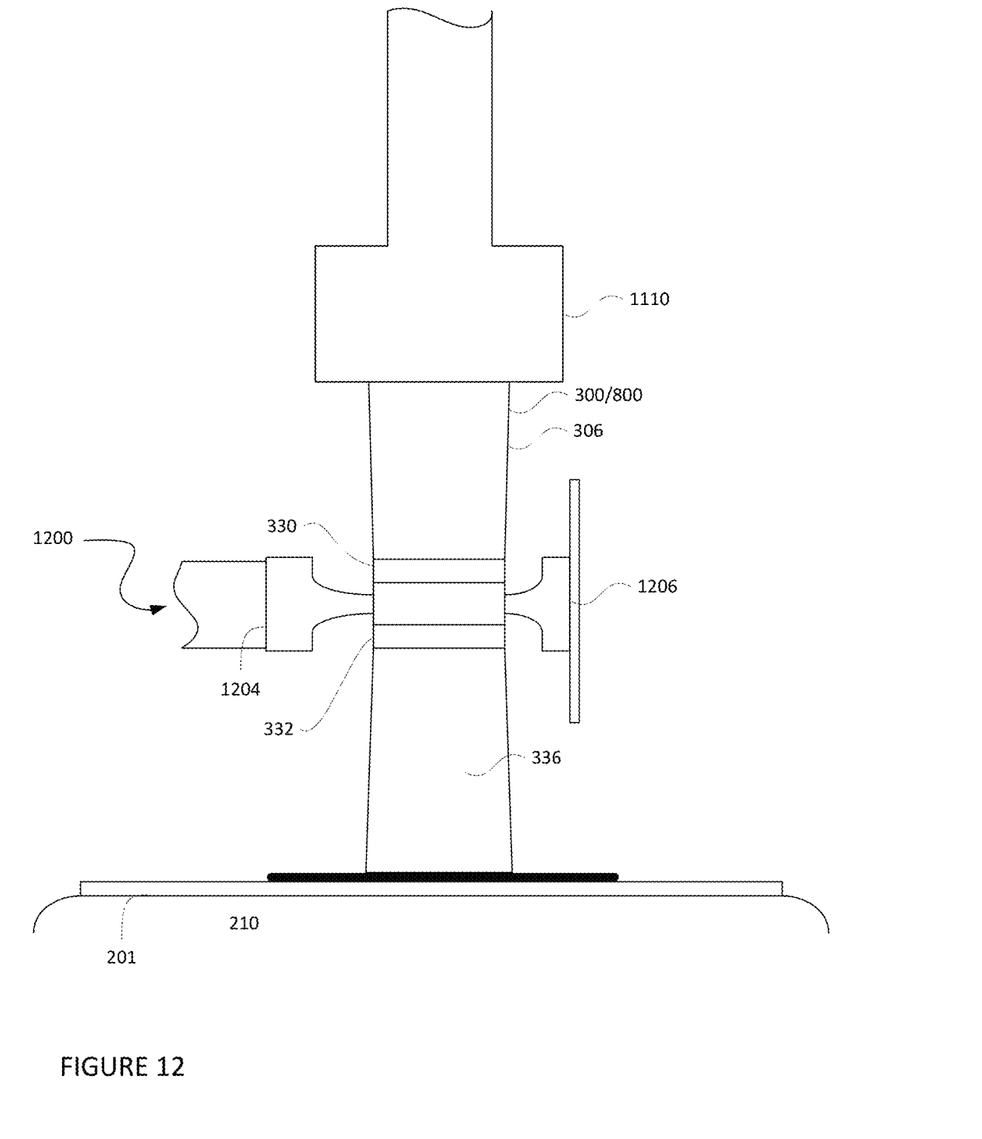
FIG. 12 is an example of a partial view of an ultrasonic welding machine arranged with a fill port assembly attached to a top plate of a balloon in accordance with aspects of the disclosure.

As shown in FIG. 12, an ultrasonic welding machine 1200 (only partially depicted) may include an anvil 1202 and a horn 1204 which are arranged at opposing sides of the external surface of the tubular body portion 306 between the welding guides 330, 332. In other words, the anvil and horn may be arranged to press against the external surface of the tubular body at locations corresponding to where the energy directing structures 314-318 (or 814-818) are located on the internal surface 328 of the tubular body portion 306.

In order to weld the fill port apparatus 300 (or 800) shut, the horn 1204 is vibrated so that it moves, for example, a few hundred microns back and forth against the external surface 336 of the tubular body portion 306. At the same time, the horn and anvil are moved towards one another in the direction of arrows 1206 and 1208, respectively, crushing opposing sides of the tubular body portion 306 towards one another. This causes energy directing structures 314-318 (or 814-818) from opposite sides of the internal surface 328 to contact and rub against one another. This contact and rubbing (from the vibrations of the horn 1204), in turn, causes the energy directing structures 314-318 (or 814-818) to heat up and melt which also heats up and softens the interior surface 328 proximate to the energy directing structures 314-318 (or 814-818). Again, the small dimensions of the energy directing structures 314-318 (or 814-818) allows them to heat up (and cool down) quickly.

Figure 13:
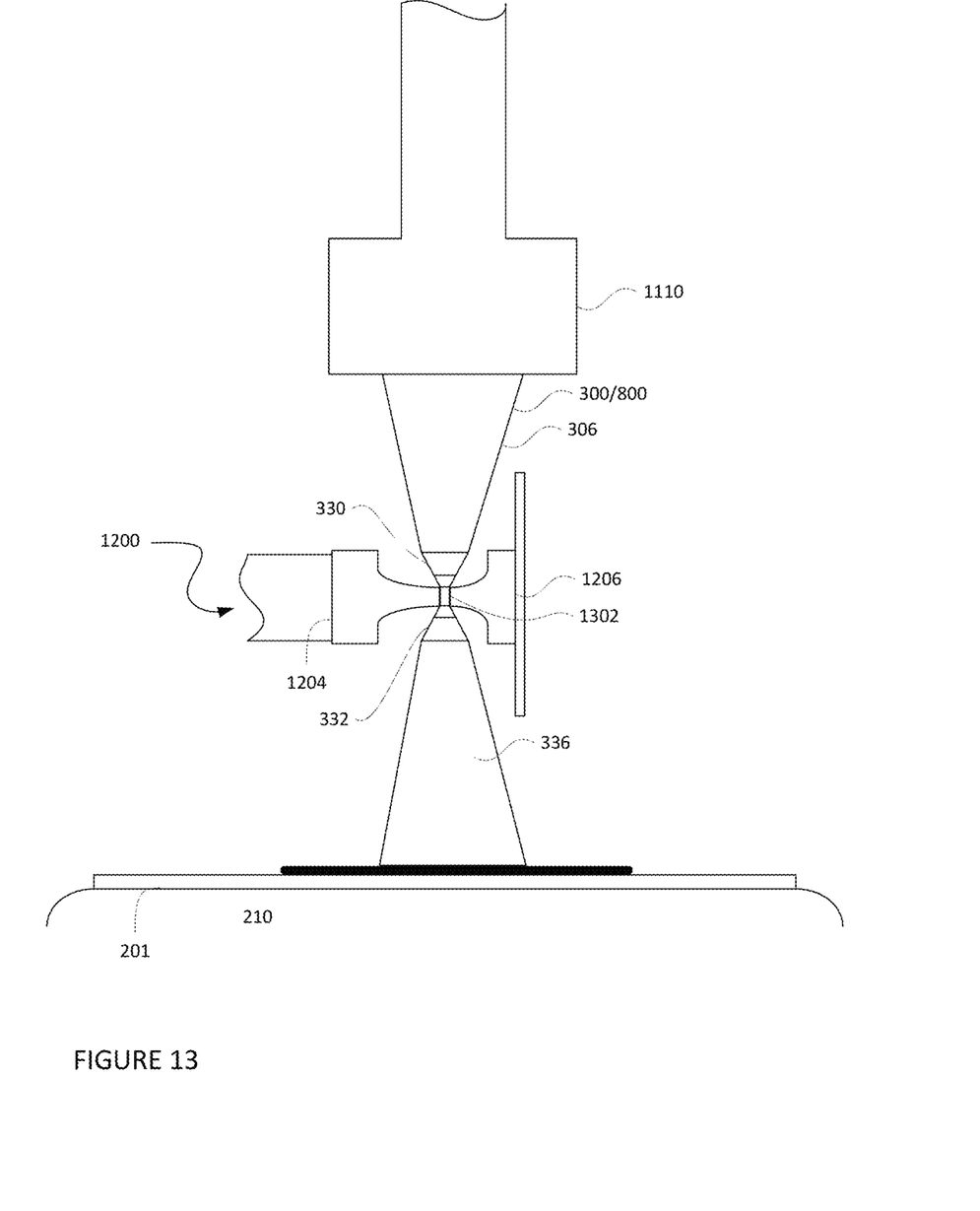
FIG. 13 is another example of a partial view of an ultrasonic welding machine arranged with a fill port assembly attached to a top plate of a balloon in accordance with aspects of the disclosure.

Once the opposite sides of the interior surface 328 and are completely pressed together as shown in FIG. 13, the vibrations are stopped, and melted energy directing structures 314-318 (or 814-818) and interior surface 328 are quickly cooled. This cooling re-hardens the plastic of the interior surface 328 and the energy directing structures 314-318 (or 814-818) forming a welded seal 1302 between the edges of the welding guides 330, 332.

While various configurations of the energy directing structures may be used, some configurations may require greater care during the welding process. For instance, the horizontal and vertical line configuration of FIG. 8 may provide a more structurally sound seal when the vertical lines are offset from one another, but the horizontal line is welded to itself. With the helical configuration of energy directing structures 314-318, however, such precision is not required because welding at different positions and angles within the welding guides would still result in a similar welded seal arrangement.

Figure 14:
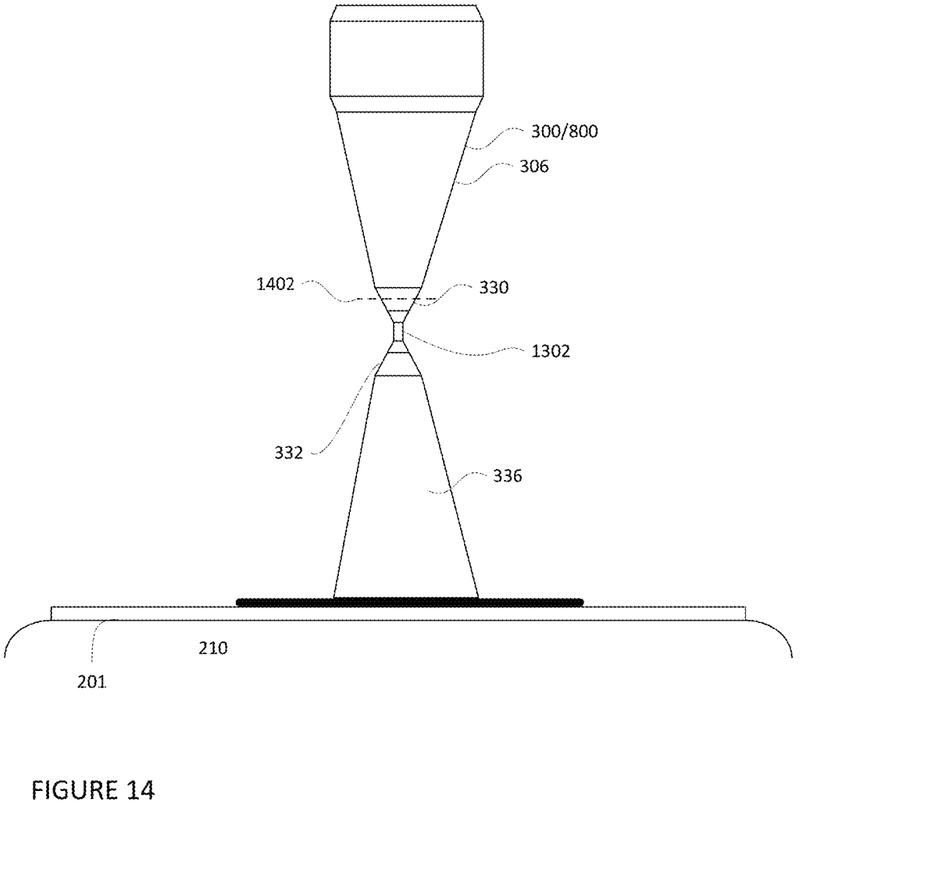
FIG. 14 is an example of a welded fill port assembly attached to a top plate of a balloon in accordance with aspects of the disclosure.

Once the welding is complete, as shown in FIG. 14, the filling device 1110 may be removed from the first end 304 of the tubular body portion 306. In addition, the first end 304 of the tubular body portion 306 may then be cut away from the balloon 200 using a knife, scissors or other cutting device at a point on the tubular body portion 306, for instance, along line 1402. In this example, line 1402 is between the area of the welded seal 1302 and the first end 304 approximately at the welding guide 330. In this regard, the welding guides 330, 332 may again be used to determine where the tubular body portion 306 should be cut. The result is a filled balloon envelope 210 with a very robust leak-free seal at the area of the weld.

Figure 15:
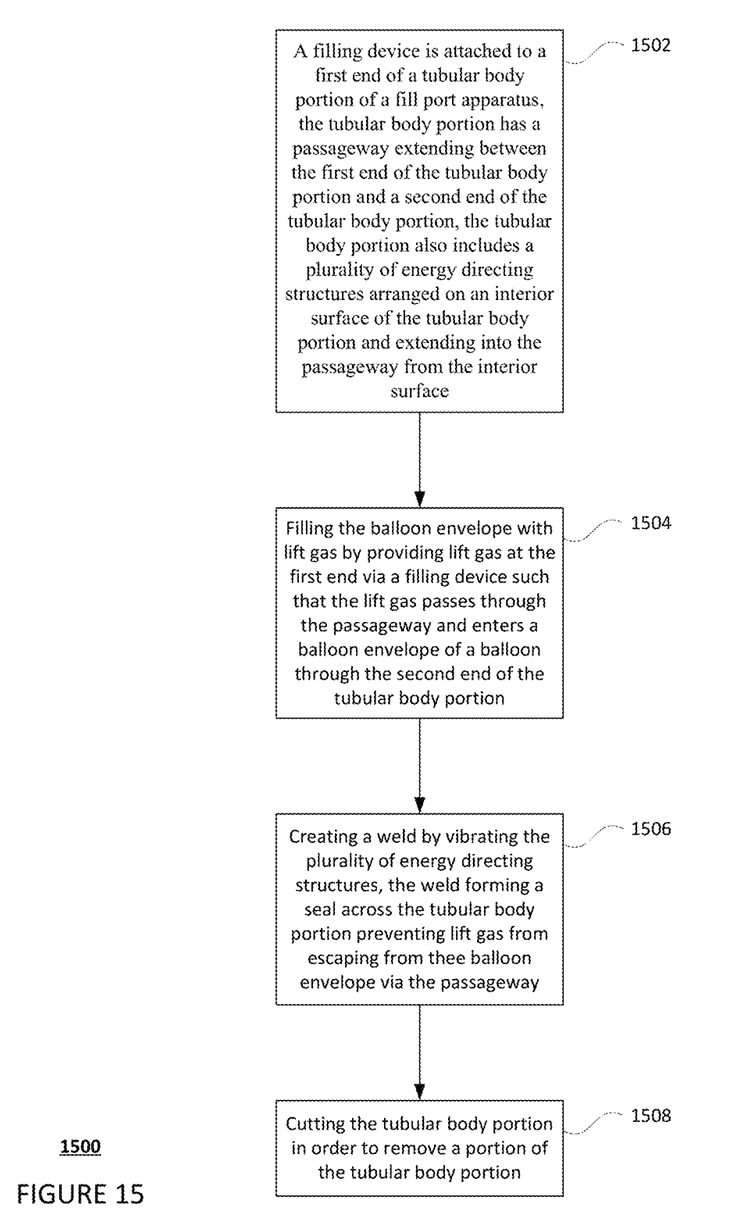
FIG. 15 is a flow diagram in accordance with aspects of the disclosure.

Flow diagram 1500 of FIG. 15 is an example flow diagram of some of the aspects described above which may be used to filling a balloon envelope of a balloon with lift gas. As indicated above, the balloon includes a top plate arranged at an apex of the balloon, and a fill port apparatus, such as a fill port apparatus 300 or 800, being attached to the top plate. A filling device is attached to a first end of a tubular body portion of the fill port apparatus at block 1502. The tubular body portion has a passageway extending between the first end of the tubular body portion and a second end of the tubular body portion. The tubular body portion also includes a plurality of energy directing structures arranged on an interior surface of the tubular body portion and extending into the passageway from the interior surface. At block 1504, the balloon envelope is filled with lift gas by providing lift gas at the first end via the filling device such that the lift gas passes through the passageway and enters the balloon envelope through the second end of the tubular body portion. A weld is created by vibrating the plurality of energy directing structures at block 1506. The weld forms a seal across the tubular body portion preventing lift gas from escaping from the balloon envelope via the passageway. The tubular body portion is cut in order to remove a portion of the tubular body portion at block 1508.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:
1. A system comprising:
  a balloon having a balloon envelope and a top plate arranged at an apex of the balloon envelope; and
  a fill port apparatus, the fill port apparatus being attached to the top plate and including:
    a tubular body portion having a passageway extending between a first end of the tubular body portion and a second end of the tubular body portion, wherein the first end is attached to the top plate, and a plurality of energy directing structures arranged on an interior surface of the tubular body portion and extending into the passageway from the interior surface, each of the plurality of energy directing structures being configured to contact at least one other of the plurality of energy directing structures when the tubular body portion is welded to itself.

2. The system of claim 1, wherein the second end is configured to attachment with a filling device for filling the balloon envelope with lift gas via the passageway.

3. The system of claim 1, wherein the apparatus consists of a plastic.

4. The system of claim 1, wherein the plurality of energy directing structures are arranged in a helical configuration.

5. The system of claim 1, wherein the plurality of energy directing structures include a first energy directing structure arranged to extend around an entire circumference of the interior surface of the tubular body portion.

6. The system of claim 5, wherein a portion of the plurality of energy directing structures are arranged to extend away from the first energy directing structure.

7. The system of claim 1, wherein the fill port apparatus further includes a pair of welding guides arranged on an exterior surface of the tubular body portion, wherein the welding guides indicate an area on exterior surface that corresponds to locations of the plurality of energy directing structures on the interior surface.

8. The system of claim 1, wherein a width dimension of each of the plurality of energy directing structures is less than 1 millimeter.

9. The system of claim 1, wherein each of the plurality of energy directing structures extends no more than 1 millimeter outward from the interior surface into the passageway.

10. The system of claim 1, wherein the fill port apparatus includes a radial projection configured for attachment with a filling device for filling the balloon envelope of the balloon with lift gas via the passageway.

* * * * *